United States Patent Office 3,507,844
Patented Apr. 21, 1970

3,507,844
FLUOROELASTOMER SEALANTS
George Wood, Farnham, Surrey, England, assignor to Minister of Aviation in Her Britannic Majesty's Government of the United Kingdom of Great Britain and Northern Ireland, London, England
No Drawing. Filed Aug. 1, 1966, Ser. No. 569,041
Claims priority, application Great Britain, Aug. 3, 1965, 33,119/65; Nov. 30, 1965, 50,767/65
Int. Cl. C08f 27/02, 35/02, 29/16
U.S. Cl. 260—87.7                     1 Claim

ABSTRACT OF THE DISCLOSURE

A process for dehydrofluorinating a fluorocarbon elastomer which comprises dissolving the elastomer in dimethylformamide or dimethylacetamide, optionally also in the presence of an alkali cyanide, an alkali thiocyanate, or an alkaline earth metal nitrate.

---

The present invention relates to fluorocarbon elastomers.

Fluorocarbon elastomers are essentially saturated polymeric compounds which have relatively high thermal stability and resistance to chemical attack. However these desirable properties limit the range of practical uses of fluorocarbon elastomers as they can only be cured with difficulty, requiring the application of heat for prolonged periods. In particular the use of fluorocarbon elastomers as sealants has been limited by the difficulty of effectively curing the elastomer in situ.

The invention provides a process whereby fluorocarbon elastomers can be chemically modified so that they are more chemically active and can be more readily cured, that is to say cured more rapidly and/or cured at lower temperatures or otherwise undergo desired chemical reactions.

In accordance with the invention, a fluorocarbon elastomer is dehydrofluorinated and thereby rendered more readily curable by dissolving it at a normal or moderately elevated temperature in a substituted amide solvent, for example, dimethylformamide or dimethylacetamide.

The substituted amide acts as both solvent and reagent and it has been found that the process takes place more readily and can even be effected at ambient temperatures, if a salt is present which is soluble in the substituted amide. Salts which may be used include alkali (which includes ammonium) cyanides and thiocyanates and alkaline earth metal nitrates. Specific examples of these salts are sodium, potassium and ammonium cyanide, sodium, potassium and ammonium thiocyanate, and calcium nitrate.

The process involves dehydrofluorination of the polymeric fluorocarbon elastomer and may involve degradation of the polymer to a lower molecular weight.

Fluorocarbon elastomers which can be rendered more readily curable by the process includes those based on hexafluoropropylene and vinylidene fluoride such as the various Viton (trademark) elastomers which are copolymers or terpolymers of hexafluoropropylene and vinylidene fluoride with or without further constituents such as tetrafluoroethylene. In particular the elastomer known as Viton A, the copolymer of vinylidene fluoride and hexafluoropropylene, generally in a ratio of about 60 to 40 by weight, and the elastomer known as Viton B, may both be rendered more readily curable by the process.

The process in accordance with the invention can also render a fluorocarbon elastomer more readily curable in the sense that curing can be effected at a reasonable rate by a curing agent which cannot cure the untreated fluorocarbon elastomer in a reasonable time. Thus a treated Viton elastomer can be cured by divinyl benzene or triallyl cyanurate whereas these agents cannot be used in practice to cure the untreated elastomers.

Copolymerisation of fluorocarbon elastomers with other polymeric materials is also made easier if the fluorocarbon elastomer is first dehydrofluorinated in a process in accordance with the invention. Thus a fluorocarbon elastomer and a fluorosilicone may be crosslinked to give a rubber which has superior tear resistance to that of a fluorosilicone rubber and superior low temperature properties to that of a fluorocarbon rubber.

The preparation and properties of various modified fluorocarbon elastomers in accordance with the invention will now be described by way of example.

EXAMPLE 1

30 g. of Viton A were dissolved in 450 ml. of dimethylformamide and refluxed for one hour. The gum was precipitated by pouring as a thin stream into a larger volume of cold water. The gum was a distinct amber colour and was more easily milled than the original Viton A.

EXAMPLE 2

30 g. of Viton A, 15 g. of sodium thiocyanate and 450 ml. of dimethylformamide were heated under reflux for 15 minutes. On recovery of the gum as described in Example 1 a product very similar in appearance and properties was obtained.

EXAMPLE 3

25. g. of Viton B were dissolved in 450 ml. of dimethylformamide together with a solution of 0.2 g. sodium cyanide in 100 ml. of the same solvent. The mixture was stirred vigorously for only sixty seconds and then thrown into water to precipitate the gum. It was of similar physical appearance to the gums obtained in Examples 1 and 2 but was more degraded chemically as was shown by being more readily soluble in solvents such as acetone. The gum was also more easily milled than the original Viton gum.

EXAMPLE 4

A quantity of Viton A was refluxed in dimethylformamide as described in Example 1. After precipitation the dry gum was dissolved in methyl ethyl ketone to give a 30° w./w. solution. 2% by wt. of hexamethylene diamine was added as curing agent and effected a rapid cure as was shown by increasing insolubility. The elastomer was substantially cured after 24 hours at room temperature when the swelling index was about 0.17 unit.

A sample of untreated Viton A, similarly made into a 30% w./w. solution in methyl ethyl ketone was only slowly cured at room temperature 2% by wt. of hexamethylene diamine. Its swelling index was only 0.08 unit after 24 hours and 0.15 unit after 100 hours, while the value of 0.17 unit was not reached until 200 hours.

EXAMPLE 5

The dehydrofluorinated Viton A as prepared in Example 1 was incorporated in the following composition which was compounded on a rubber mill:

|  | G. |
|---|---|
| Dehydrofluorinated Viton A | 100 |
| Magnesium oxide | 15 |
| Medium thermal black (carbon black) | 20 |
| Divinyl benzene in 55% w./w. ethyl vinyl benzene solution | 1.5 |

The composition was cured in the course of a treatment which involved ½ hour in a press at 150° C. followed by treatment in an oven for 1 hour at 150 C., 2 hours at 175° C. and then 24 hours at 200° C. As a result a high-quality vulcanisate was obtained which had a tensile strength of 2000 lbs per sq. in., an elongation to break of 170% and a modulus for a 1% strain of 492 lbs. per sq. in.

EXAMPLE 6

A 20% w./w. solution of Viton A was refluxed in dimethyl formamide for fifteen minutes and the gum precipitated by pouring into water. The dehydrofluorinated gum was dissolved in acetone and reprecipitated and then dried in an oven at 60° C. for one week.

100 g. of the dehydrofluorinated Viton A were mixed with 15 g. of magnesium oxide and 2 g. of hexamethylenediamine. The composition vulcanised on standing at room temperature; the progress of vulcanisation is shown by the test results given in the following Table 1.

TABLE 1

| Time in hours at room temperature | Fraction soluble in acetone at 28°C., percent | $V_r$ in acetone at 28° C. |
|---|---|---|
| 0 | 100 | |
| 6 | 38 | 0.06 |
| 10 | 30 | 0.12 |
| 20 | 20 | 0.155 |
| 25 | 17 | 0.17 |
| 40 | 13 | 0.18 |
| 60 | 9 | 0.186 |
| 80 | 7 | 0.19 |

$V_r$ is the volume fraction of elastomer in the swollen phase.

The compound is virtually fully vulcanised after 48 hours at room temperature.

These figures compare very favourably with known fluorocarbon elastomer sealants in which full vulcanisation as long as twelve days to complete.

EXAMPLE 7

Viton A elastomer was dehydrofluorinated as described in Example 1 and was incorporated in the following composition which was compounded on a rubber mill.

|   | G. |
|---|---|
| Dehydrofluorinated Viton A | 75 |
| Fluorosilicone gum (Dow Corning A 1025-116-5) | 26 |
| Magnesium oxide | 25 |
| Medium thermal black (carbon black) | 20 |
| Peroxide cross-linking agent (Dicup 40c Hercules Powder Co.) | 5 |
| Copper inhibitor 65 (Du Pont) | 0.5 |

The composition was cured in a course of treatment which involved 1 hour in a press at 160° C. followed by 24 hours in an oven at 200° C.

A high quality vulcanisate was obtained whose Clash and Berg temperature was −25° C. The Clash and Berg temperature for Viton A alone is about −16° C.

The removal of solvent by pouring the gum into water, as hereinbefore described is a very simple and inexpensive way of carrying out this part of the process. Other methods are known to those skilled in the art, for example, distillation.

I claim:
1. A process for dehydrafluorinating an elastomeric vinylidene fluoride/hexafluoropropylene copolymer which comprises the steps of dissolving the elastomer in dimethylformamide or dimethylacetamide together with a salt selected from the group consisting of sodium cyanide and sodium thiocyanate, pouring the elastomer solvent into water, and collecting the precipitated dehydrofluorinated elastomer, said vinylidene fluoride/hexafluoropropylene copolymer containing 60% by weight vinylidene fluoride and 40% by weight hexafluoropropylene.

References Cited

UNITED STATES PATENTS

| 2,810,702 | 10/1957 | Bechtold | 260—29.6 |
| 2,927,908 | 3/1960 | Konkle et al. | 260—827 |
| 3,069,378 | 12/1962 | Prober | 260—827 |
| 3,069,401 | 12/1962 | Gallagher | 260—87.7 |
| 3,139,470 | 6/1964 | Prengle et al. | 264—289 |
| 3,147,314 | 9/1964 | Cluff | 260—87.7 |
| 3,211,687 | 10/1965 | Capron et al. | 260—32.6 |
| 3,243,411 | 3/1966 | Tawney et al. | 260—87.7 |

FOREIGN PATENTS 1,488,595   6/1967   France.

OTHER REFERENCES

Lutherau: "Comptes Rendu," Ser. C, vol. 262(5), pp. 400–402, January 1966.

Wolkober et al.: "Jour. Polymer Science," vol. 53 (1961), pp. 157–161.

Roth et al.: "Jour. Polymer Science," Part C, No. 4 (1964), pp. 1347–66, pp. 1349–58 and 1364–5 only needed.

SAMUEL H. BLECH, Primary Examiner

U.S. Cl. X.R.

260—32.6, 32.8, 41, 80.77, 827, 884